United States Patent
Vaders

(10) Patent No.: US 7,314,585 B2
(45) Date of Patent: Jan. 1, 2008

(54) METHOD OF MANUFACTURING CONTOURED CONSOLIDATED CELLULOSIC PANELS WITH VARIABLE BASIS WEIGHT

(75) Inventor: Dennis H. Vaders, Elkin, NC (US)

(73) Assignee: Masonite Corporation, Tampa, FL (US)

( * ) Notice: Subject to any disclaimer, the term of this patent is extended or adjusted under 35 U.S.C. 154(b) by 326 days.

(21) Appl. No.: 11/066,972

(22) Filed: Feb. 28, 2005

(65) Prior Publication Data

US 2005/0140043 A1    Jun. 30, 2005

Related U.S. Application Data

(62) Division of application No. 09/996,206, filed on Nov. 28, 2001, now Pat. No. 6,866,740.

(51) Int. Cl.
    *B27N 5/00*    (2006.01)
(52) U.S. Cl. .................. 264/120; 264/118; 264/119
(58) Field of Classification Search ............... None
    See application file for complete search history.

(56) References Cited

U.S. PATENT DOCUMENTS

| | | | |
|---|---|---|---|
| 1,867,575 A | 7/1932 | Loetscher | |
| 2,260,453 A | 10/1941 | Hartman | 18/61 |
| 2,635,301 A * | 4/1953 | Schubert et al. | 425/83.1 |
| 2,907,071 A | 10/1959 | Meiler et al. | 18/47.5 |
| 2,925,360 A * | 2/1960 | Roberts et al. | 264/518 |
| 3,057,022 A | 10/1962 | Bär et al. | 19/155 |
| 3,549,738 A | 12/1970 | Troyer | 264/118 |
| 4,096,796 A | 6/1978 | Saunders et al. | 100/35 |
| 4,169,748 A | 10/1979 | Clarke et al. | 156/62.2 |
| 4,175,106 A | 11/1979 | Clarke et al. | 264/118 |
| 4,221,751 A | 9/1980 | Haataja et al. | 264/119 |
| 4,378,265 A | 3/1983 | Kiss | 156/242 |
| 4,421,700 A | 12/1983 | Patel | 264/59 |
| 4,435,353 A * | 3/1984 | Forry et al. | 264/518 |
| 4,568,581 A | 2/1986 | Peoples, Jr. | 428/35 |
| 4,666,647 A | 5/1987 | Enloe et al. | 264/121 |
| 4,690,853 A | 9/1987 | Hammond | 428/157 |
| 4,693,860 A | 9/1987 | Thelen | 264/320 |
| 4,734,236 A | 3/1988 | Davis | 264/112 |
| 4,761,258 A | 8/1988 | Enloe | 264/518 |
| 4,852,630 A | 8/1989 | Hamajima et al. | 164/761 |
| 4,865,798 A * | 9/1989 | Henschel et al. | 264/518 |
| 4,869,855 A | 9/1989 | Twilley et al. | 264/25 |
| 4,923,658 A | 5/1990 | Hover et al. | 264/76 |
| 4,927,582 A | 5/1990 | Bryson | 264/113 |
| 5,183,622 A | 2/1993 | Persson | 264/320 |
| 5,427,723 A | 6/1995 | Kugler et al. | 264/119 |
| 5,756,024 A | 5/1998 | Huang | 264/113 |
| 5,807,513 A | 9/1998 | Gebreselassie et al. | 264/37.3 |

FOREIGN PATENT DOCUMENTS

WO    WO 00/6792    * 11/2000

* cited by examiner

*Primary Examiner*—Mary Lynn Theisen
(74) *Attorney, Agent, or Firm*—Berenato, White & Stavish

(57) ABSTRACT

A method of manufacturing a contoured, consolidated cellulosic article, with variable basis weight, is disclosed. The method employs a former to create a mat having a substantially uniform thickness which is pre-pressed to retain its shape. The pre-pressed mat is then machined along at least one surface to result in a desirable contour. The contoured mat is then consolidated within a secondary press. The secondary press preferably includes platens shaped complementarily to the surfaces of the mat.

10 Claims, 4 Drawing Sheets

METHOD OF MANUFACTURING CONTOURED CONSOLIDATED CELLULOSIC PANELS WITH VARIABLE BASIS WEIGHT

CROSS REFERENCE TO RELATED APPLICATION AND CLAIM TO PRIORITY

The present application is a divisional of U.S. application Ser. No. 09/996,206, filed Nov. 28, 2001 now U.S. Pat. No. 6,866,740 the disclosure of which is hereby incorporated by reference, and to which priority is claimed under 35 U.S.C. §120.

BACKGROUND OF THE INVENTION

1. Field of the Invention

The invention generally relates to wood products and, more particularly, relates to methods of manufacturing consolidated cellulosic panels.

2. Description of Related Technology

Consolidated cellulosic panels, such as fiber board, paper board, particle board, and the like, are typically comprised of wood furnish such as saw dust, shavings, chips, or specially ground fibers, compressed with a binding agent or resin under heat and pressure. Such boards can be used in a variety of applications including, but not limited to, exterior house siding, interior and exterior door facing panels or door skins, cabinet doors, paneling, moulding, etc.

It is often desirable to manufacture such panels to a uniform basis weight and caliper. If the panels are flat this can be accomplished by compressing a mat between first and second flat faced dies. However, if one of the faces needs to be deeply contoured, such die compressions have proven to be problematic. For example, if a first die has a contour corresponding to the desired shape of the panel, and the second die has a flat face, the mat compressed therebetween will have a non-uniform caliper, with the thinner areas of the mat being compressed to a higher density than thicker areas. This is especially true with fiberous materials that do not flow under pressure.

Current methods of producing such panels therefore typically require that a mat having first and second opposed flat surfaces be compressed according to conventional methods, and that one or more of the surfaces then be machined to have the desired contour. For example, a router may be used to shape the surfaces. U.S. Pat. No. 4,175,106, assigned to the present assignee, discloses such a process. Such tools, however, cannot easily produce sharp inside corners, are relatively slow, and require complex, expensive equipment.

Another method requires contoured, complementary, dies on both the top and bottom to produce a substantially uniform thickness through the contoured and non-contoured areas. If one of the top or bottom needs to be flat, or alternatively shaped, the panel must undergo an added machining step adding time, expense and waste to the operation. Shallow contouring of one face is typically done in an embossing operation, or with an embossing die, but the depth of embossing is greatly limited.

SUMMARY OF THE INVENTION

In accordance with one aspect of the invention, a method of manufacturing a contoured, consolidated cellulosic article having a variable basis weight is provided. The method comprises the steps of forming a loose mat of cellulosic material and a binder resin, the mat having a top surface and a bottom surface, machining at least one of the top surface and bottom surfaces to have a pattern, and consolidating the mat between a top platen and a bottom platen. The top and bottom platens have contours complementary to the patterns machined into the mat top and bottom surfaces, respectively.

In accordance with another aspect of the invention, a method of manufacturing a consolidated cellulosic article is provided comprising the steps of depositing cellulosic fiber and a binding agent onto a moving conveyor to form a mat, applying suction through the conveyor belt, scalping a top surface of the mat, compressing the mat between upper and lower platens at a first pressure, machining a pattern into the top surface by removing cellulosic material in a desired pattern, gathering the removed cellulosic material, and compressing the mat between third and fourth platens. The conveyor is perforated so as to enable the suction to hold the mat onto the belt. The scalping step creates a mat of uniform height. The third and fourth platens are contoured complementarily to contours of the top and bottom surfaces, respectively.

In accordance with another aspect of the invention, a method of manufacturing a contoured, consolidated cellulosic article with variable basis weight is provided, which comprises the steps of forming a loose mat of cellulosic material and a binder resin, the mat having a top surface and a bottom surface, prepressing the loose mat to a first density and caliper, machining at least one of the top surface and bottom surface to have a pattern, and consolidating the mat between a top platen and a bottom platen. The top and bottom platens have contours complementary to the pattern machined into the mat top and bottom surface, respectively. The consolidating step compresses the mat to a second density and caliper. The second density is greater than the first density.

These and other aspects and features of the invention will become more apparent upon reading the following detailed description when taken in conjunction with the accompanying drawings.

Figure 1:
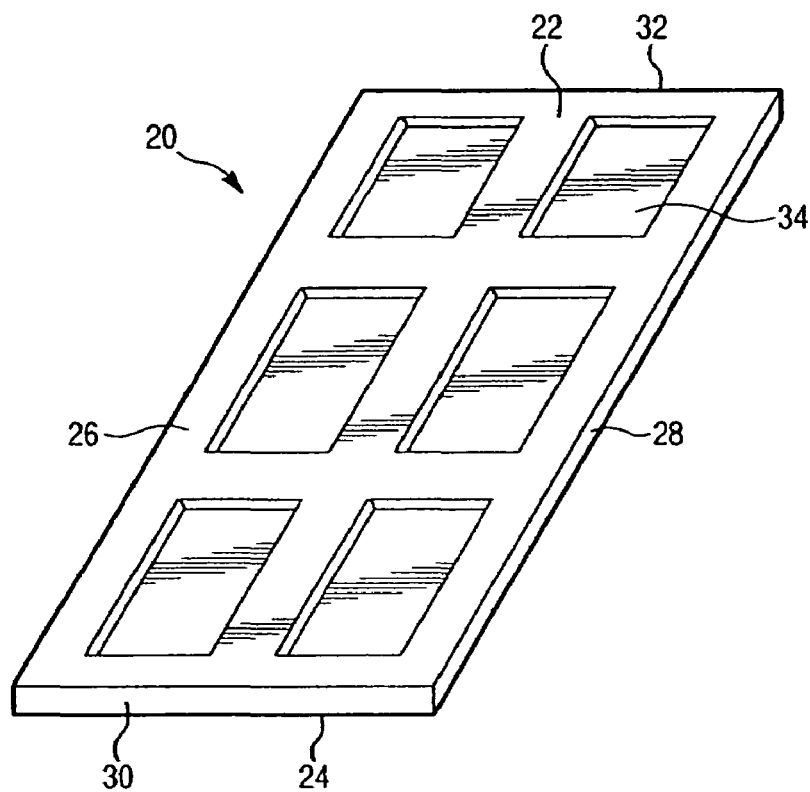
FIG. 1 is an isometric view of an article constructed in accordance with the teachings of the invention.

While the invention is susceptible to various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention as defined by the appended claims.

DETAILED DESCRIPTION OF THE PREFERRED EMBODIMENTS

Referring now to the drawings, and with specific reference to FIG. 1, an article constructed in accordance with the teachings of the invention is generally referred to by reference numeral 20. While the article 20 is depicted as a six panel door facing, it is to be understood that the teachings of the invention can be employed in the construction of any number of other consolidated cellulosic articles having a contoured surfaces such as, but not limited to, exterior house siding, interior and exterior door facing panels or door skins, cabinet doors, paneling, and moulding.

As shown in FIG. 1, the article 20 includes a first or top surface 22, a second or bottom surface 24, first and second side edges 26, 28, and first and second end edges 30, 32. The top surface 22 is contoured, whereas the bottom surface 24 is flat or planar in the depicted embodiment. More specifically, the top surface 22 includes a plurality of indentations 34 of various dimension and depth to provide an appearance desirable for the end application of the article 20. In the depicted embodiment, the bottom surface 24 is flat to facilitate attachment of the article 20 to a door core, but it is to be understood that the article 20 may include a back surface having a non-flat contour as well.

Figure 2:
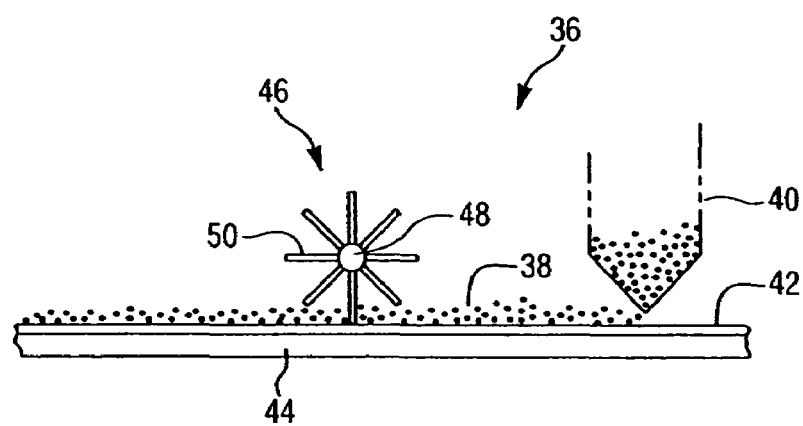
FIG. 2 is a schematic representation of a mat being preliminarily formed according to the teachings of the invention.

Referring now to FIG. 2, a former 36 according to the teachings of the invention is depicted generating a mat 38. The former 36 includes a hopper 40 from which a combination of cellulosic fibers and a binding agent or resin are deposited onto a moving conveyor belt 42. The binding agent may be any number of different known agents including, but not limited to, phenolic resin or isocyanate. The conveyor belt 42 is preferably perforated, with a suction device 44 being proximate the conveyor belt 42. The suction device 44 generates a pressure differential across the conveyor belt 42 thereby holding the mat 38 to the conveyor belt 42.

As can be seen in FIG. 2, the cellulosic material is deposited upon the conveyor belt 42 at an inconsistent height (exaggerated in FIG. 2 for the purpose of illustration). Accordingly, downstream of the hopper 40 a rotary scalper 46 may be provided. The scalper 46 includes a rotating axle 48 from which a plurality of blades 50 radially extend. Rotation of the scalper 46 causes the blades 50 to engage the mat 38 and thereby reduce the mat 38 to a consistent thickness. It is to be understood that the scalper 46 may be provided in alternative forms, such as saw blades, for removal of the cellulosic material.

Figure 3:
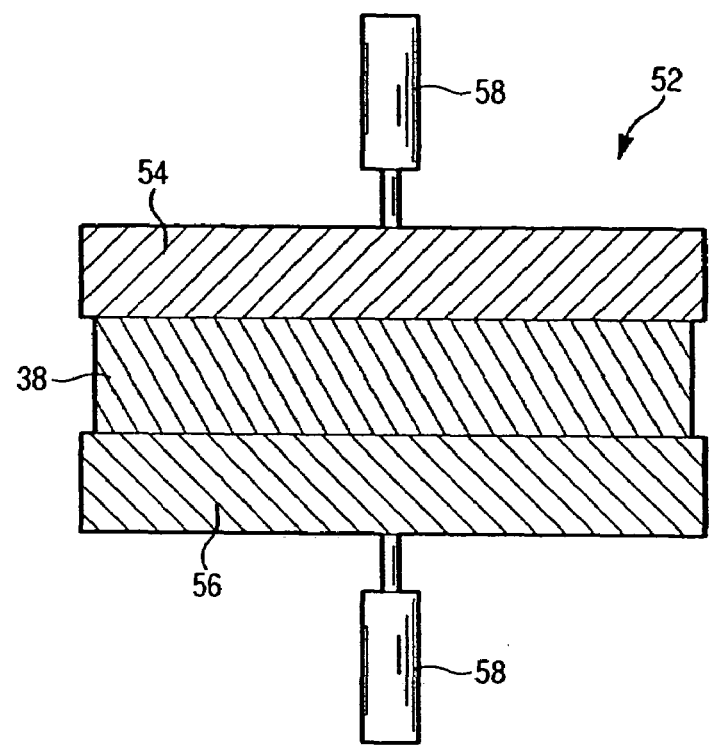
FIG. 3 is a partial sectional view of a mat being prepressed according to the teachings of the invention.

Referring now to FIG. 3, a pre-press 52 according to the teachings of the invention is depicted. The pre-press 52 includes a first platen 54 as well as a second platen 56 which are adapted to be compressed together as by hydraulic cylinders 58. The pre-press 52 compresses the mat 38 to a softboard 53, defined herein as a compressed mat of cellulosic fiber and a binding agent having a relatively low density, e.g., 10 to 30 lbs. per cubic foot. Such a softboard has sufficient density and strength to maintain its shape, as opposed to being a loose pile of fibers, but would not be suitable for use as a solid product such as siding or doors. The softboard 53 is preferably formed in the absence of heat or moisture so as to avoid curing of the binding agent and thereby allow for the material removed, as by the rotary scalper 46, to be recycled.

Figure 4:
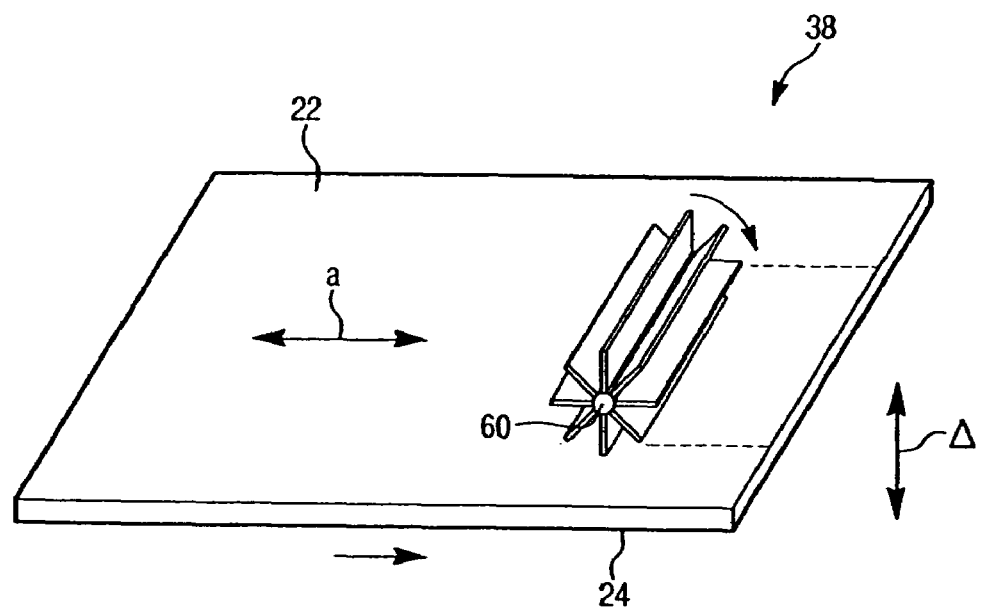
FIG. 4 is a schematic representation of a mat being machined in two dimensions according to the teachings of the invention.
Figure 5:
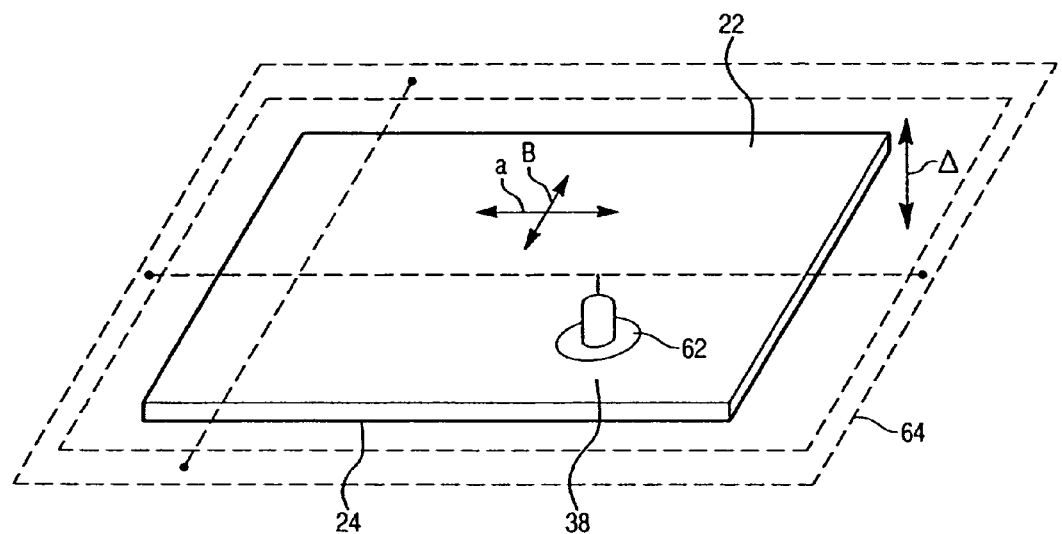
FIG. 5 is a schematic representation of a mat being machined in three dimensions according to the teachings of the invention.

Once the softboard 53 is formed, it is machined as shown in FIGS. 4 and 5, resulting in a softboard 53 having a variable basis weight across its dimension. For example, as shown in FIG. 4, the top surface 22 of the softboard 53 may be machined along a single axis, e.g., a longitudinal axis α, to provide a contoured top surface 22 while maintaining the bottom surface 24 in a planar configuration. If the softboard 53 is machined as depicted in FIG. 4, wherein a second rotary scalper 60 removes material along the longitudinal axis ∝, (as well as a depth axis Δ) material such as house siding can be easily manufactured. If the end product needs to be machined along the longitudinal and lateral axes α and β (as well as along the depth axis Δ) as with a six panel door as depicted in FIG. 1, a router 62 may be employed as shown in FIG. 5. The router 62 is preferably mounted on a track system 64 and connected to a CNC control (Computer Numerical Control) or the like for movement of the router 62 in appropriate directions.

Figure 6:
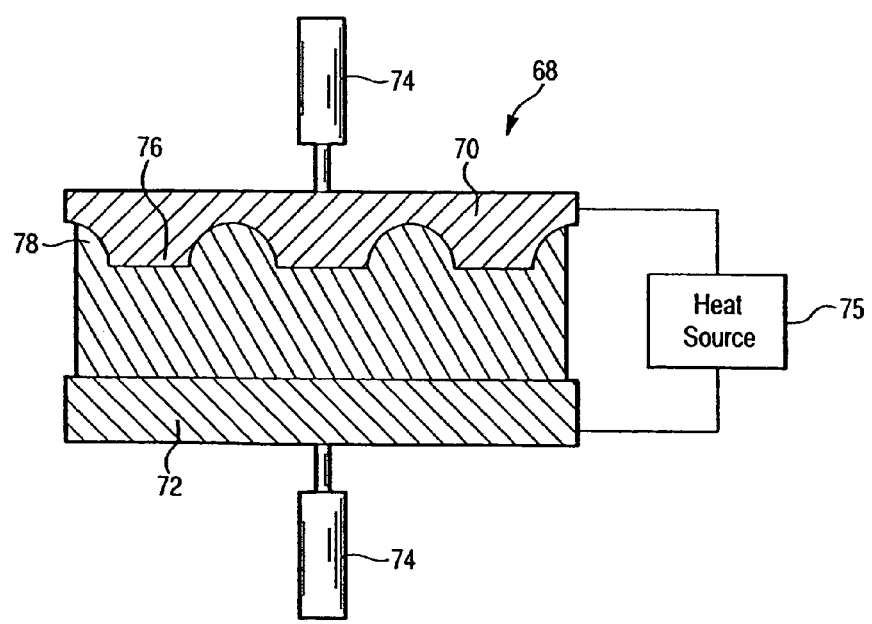
FIG. 6 is a partial sectional view of a mat being compressed under heat and pressure according to the teachings of the invention.

Referring now to FIG. 6, a secondary press 68 according to the teachings of the invention is shown in partial sectional view. The secondary press 68 preferably includes an upper platen 70, a lower platen 72 and a mechanism for compressing the upper and lower platens 70 and 72 together. Such a mechanism may be provided in the form of hydraulic cylinders 74, but may be provided in any other type of actuator including, but not limited to, pneumatic cylinders, motors, and the like.

In the depicted embodiment, the upper platen 70 includes a plurality of protrusions 76 such that the contour of the upper platen 70 is complementarily shaped to a pattern 78 formed in the upper or top surface 22 of the mat 38. Also in the depicted embodiment, the lower platen 72 is flat or planar so as to match the planar shape of the bottom surface 24, but it is to be understood that if the bottom surface 24 is otherwise contoured, the lower platen 72 would be shaped to correspond to the contour of the bottom surface 24.

The secondary press 68 preferably has a heat source 75 associated therewith to compress the softboard 53 under heat and pressure. The heat source 75 may be provided in the form of heat exchanger coils or channels through the platens 70, 72, through which heated fluid, e.g., water, is circulated, or in the form of separate hot platens.

Figure 7:
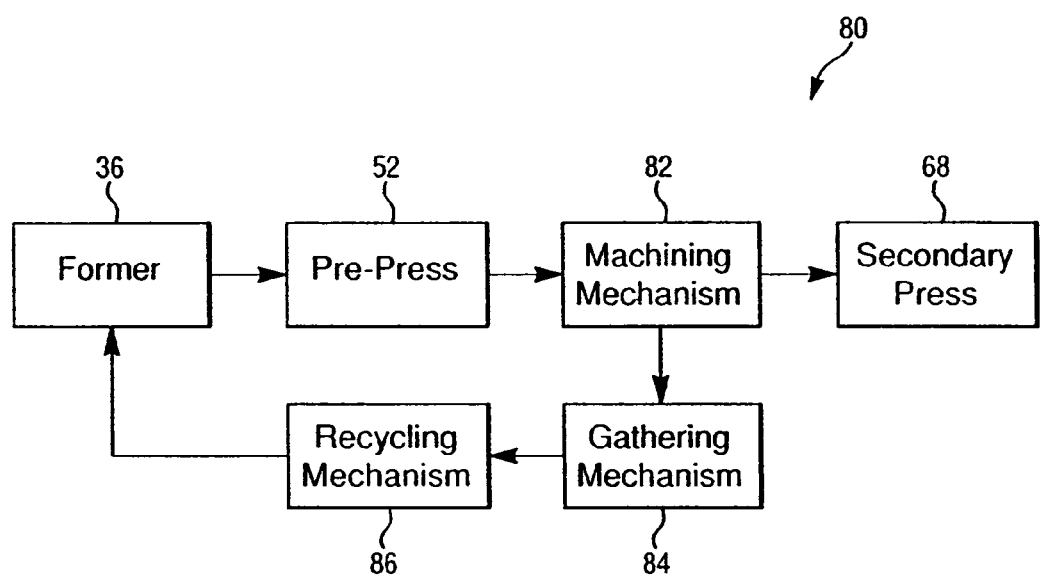
FIG. 7 is a schematic representation of a system constructed in accordance with the teachings of the invention.

Referring now to FIG. 7, a system 80 according to the teachings of the invention is shown in schematic fashion. As shown therein, the system 80 includes the former 36, the pre-press 52, a machining mechanism 82, the secondary press 68, as well as a gathering mechanism 84 and a recycling mechanism 86.

The machining mechanism 82 may be provided in the form of the aforementioned rotary scalper 60 or router 62, but can alternatively be provided in the form of any other type of mechanism for removing cellulosic material from the mat 38 including, but not limited to, circular saw blades, band saw blades, sanders, and the like. The gathering mechanism 84 may be provided in the form of a conveyor provided below the machining mechanism 82, or may be provided in the form of a vacuum device for drawing the removed cellulosic material away. The recycling mechanism 86 preferably communicates the material gathered by mechanism 84 back to the former 36 for use in the formation of subsequent articles 20. Accordingly, the recycling mechanism 86 may include conveyors, suction lines, or the like.

From the foregoing, it will be appreciated that the teachings of the invention may be employed to manufacture a contoured, consolidated cellulosic article having variable basis weight.

What is claimed is:

1. A method of manufacturing a contoured, consolidated cellulosic article with variable basis weight, comprising:
   forming a loose mat of cellulosic material and a binder resin;
   compressing the loose mat to form a softboard;
   machining at least one planar surface to have a pattern; and
   compressing the machined softboard between first and second platens while applying heat to cure the binder resin to form a contoured article.

2. The method of claim 1, wherein the softboard has a density of between about 10 to about 30 pounds per cubic foot.

3. The method of claim 1, including the step of scalping an upper portion of the mat and thereby reducing the mat to a consistent thickness prior to compressing the loose mat.

4. The method of claim 3, including the step of providing a rotary scalper for said scalping step.

5. The method of claim 1, including the step of compressing the loose mat in the absence of heat or moisture.

6. The method of claim 1, wherein the machining step is performed along at least one of a longitudinal axis and a lateral axis of the softboard.

7. The method of claim 1, including the further step of depositing cellulosic fiber and a binding agent onto a moving conveyor belt to form the mat.

8. The method of claim 7, including the further steps of:
   providing a perforated conveyor belt;
   applying suction through the conveyor belt sufficient to hold the mat to the belt.

9. The method of claim 7, wherein the machining step comprises providing a router and track system operably associated with one another, the router being mounted on the track system to be moved in two dimensions along the softboard; and
   routing at least the first major planar surface to have a pattern.

10. A method of manufacturing a contoured, consolidated cellulosic article with variable basis weight, comprising:
   forming a loose mat of cellulosic material and a binder resin;
   compressing the loose mat to form a softboard;
   machining the softboard to have a pattern; and
   compressing the machined softboard while applying heat to cure the binder resin to form a contoured article.

* * * * *